United States Patent
Tran

(10) Patent No.: US 6,856,948 B1
(45) Date of Patent: Feb. 15, 2005

(54) CALL ADMISSION CONTROL FOR NONHOMOGENOUS SOURCES

(75) Inventor: Hung V. Tran, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 996 days.

(21) Appl. No.: 09/711,342

(22) Filed: Nov. 9, 2000

(51) Int. Cl.[7] .............................................. G06F 17/10
(52) U.S. Cl. ..................... 703/2; 709/224; 370/230.1; 370/232
(58) Field of Search ........................... 703/2; 709/224; 340/907; 370/17, 60, 60.1, 94.1, 230, 230.1, 232–234, 252, 253, 412

(56) References Cited

U.S. PATENT DOCUMENTS

| | | | | |
|---|---|---|---|---|
| 5,850,385 A | * | 12/1998 | Esaki ...................... | 370/395.21 |
| 6,222,824 B1 | * | 4/2001 | Marin et al. ................. | 370/230 |
| 6,233,226 B1 | * | 5/2001 | Gringeri et al. ............ | 370/252 |
| 6,459,681 B1 | * | 10/2002 | Oliva ......................... | 370/232 |
| 6,567,415 B1 | * | 5/2003 | Elwalid et al. ............. | 370/412 |

OTHER PUBLICATIONS

Yu et al., X. Upper Bounds for Individual Queue Length Distribution in GPS with LRD Traffic Input, IEEE, Global Telecommunications Conference, Globecom '01, Nov. 2001, pp. 2336–2340.*

Jouaber et al., B. Modeling the Sliding Window Mechanism, IEEE International Conference on Communications, ICC 98, vol. 3, Jun. 1998, pp. 1749–1753.*

Ren et al., Q. Diffusion Approximation Modeling for Markov Modulated Bursty Traffic and Its Applications to Bandwidth Allocation in ATM Networks, IEEE Journal on Selected Areas in Communications, vol. 16, No. 5, Jun. 1998, pp. 679–691.*

Mang et al., X. Call Admission Control in ATM Using the Diffusion Model, IEEE, Global Telecommunications Conference, Globecom '96, vol. 3, Nov. 1996, pp. 1700–1704.*

Roughan et al., M. On–Line Estimation of the Parameters of Long–Range Dependence, IEEE, Global Telecommunications Conference, Globecom '98, vol. 6, Nov. 1998, pp. 3716–3721.*

Garroppo et al., R.G. A CAC Algorithm for per–VC Queueing Systems Loaded by Fractal Traffic, IEEE, Global Telecommunications Conference, Globecom '99, 1999, pp. 1610–1615.*

W. Leland, M. Taqqu, W. Willinger, D. Wilson, *On the Self–Similar Nature of Ethernet Traffic*, IEEE/ACM Transactions of Networking, vol. 2 No. 1, Feb. 1994, pp. 1–15.

W. Willinger, M.S. Taqqu, R. Sherman, D.V. Wilson, *Self–Similarity through High–Variability: Statistical Analysis of Ethernet LAN Traffic at the Source Level*, IEEE/ACM Transactions on Networking, vol. 5 No. 1 Feb. 1997, pp. 71–86.

K. Park, G. Kim, M. Crovella, *On the Relationship between File Sizes, Transport Protocols, and Self–Similar Network Traffic*, 1996 International Conference on Network Protocols, pp. 171–180.

(List continued on next page.)

Primary Examiner—Russell Frejd
(74) Attorney, Agent, or Firm—Haynes and Boone, LLP

(57) ABSTRACT

A reliable system and method is provided for approximating a required network capacity for inhomogeneous self-similar traffic sources in a multimedia packet network. A diffusion model is first constructed for the multimedia packet network, the diffusion model assuming an input process representing the traffic sources is a sum of a plurality of independent fractional Gaussian noise processes with a plurality of corresponding Hurst parameters. A predetermined Weibull function contained in the diffusion model is then approximated, and the acceptance of a new traffic source is determined based on a predetermined packet loss probability parameter contained in the diffusion model.

10 Claims, 1 Drawing Sheet

OTHER PUBLICATIONS

M. Crovella, A. Bestavros, *Self–Similarity in World Wide Web Traffic: Evidence and Possible Causes*, IEEE/ACM Transactions on Networking, vol. 5 No. 6, Dec. 1997, pp. 835–846.

A. Adas, *Traffic Models in Broadband Networks*, IEEE Communications Magazine, Jul. 1997.

I. Norros, *On the Use of Fractional Brownian Motion in the Theory of Connectionless Networks*, IEEE Journal on Selected Areas in Communications, vol. 13 No. 6, Aug. 1995, pp. 953–962.

M. Borella, S. Uludag, G. Brewster, I. Sidhu, *Self–Similarity of Internet Packet Delay*, IEEE International Conference on Communications, 1997; ICC '97 Montreal, Towards the Knowledge Millennium 1997, vol. 1, pp. 513–517.

N.G. Duffield, J.T. Lewis, N. O'Connell, R. Russell, F. Toomey, *Statistical Issues Raised by the Bellcore Data*, Performance Engineering in Telecommunications Networks, IEE Eleventh UK, 1994, pp. 1/1–1/8.

N.G. Duffield J. T. Lewis, N. O'Connell, *Predicting Quality of Service for Traffic with Long–Range Fluctuations*, IEEE International Conference on 'Gateway to Globalization', 1995, vol. 1, pp. 473–477.

S. Giordano, S. Miduri, M. Pagano, F. Russo, S. Tartarelli, *A Wavelet–based Approach to the Estimation of the Hurst Parameter for Self–Similar Data*, International Conference on Digital Signal Processing Proceedings, 1997, vol. 2, pp. 479–482.

B. Bashforth, C. Williamson, *Statistical Multiplexing of Self–Similar Video Streams: Simulation Study and Performance Results*, Proceedings, Sixth International Symposium on Modeling, Analysis and Simulation of Computer and Telecommunication System, 1998, pp. 119–126.

J. Li, A. Wolisz, R. Popescu–Zeletin, *QoS Guarantees for Long–Range Dependent Traffic*, IEEE International Performance, Computing and Communications, 1998. IPCCC '98., pp. 314–320.

S. Giordano, M. Pagano, R. Pannocchia, F. Russa, *A New Call Admission Control Scheme Based on the Self Similar Nature of Multimedia Traffic*, IEEE International Converging Conference on Technologies for Tommorow's Applications. 1966, vol. 3, pp. 1612–1618.

J. Wang, A. Erramilii, *A Connection Admission Control Algorithm for Self–Similar Traffic*, Global Telecommunications Conference, 1999. Globecom '99, vol. 2, Dec. 1999, pp. 1623–1628.

Y. Wang, C, Williamson, J. Doerksen, *CAC Performance with Self–Similar Traffic: Simulation Study and Performance Results*, 7th Proceedings International Symposium on Modeling, Analysis and Simulation of Computer and Telecommunication Systems. 1999, pp. 102–111.

M. Grossglauser, J. Bolot, *On the Relevance of Long–Range Dependence in Network Traffic*, IEEE/ACM Transactions on Networking, vol. 7, No. 5, Oct. 1999, pp. 15–24.

V. Paxson, S. Floyd, *Wide Area Traffic: The Failure of Poisson Modeling*, IEEE/ACM Transactions of Networking, vol. 3, pp. 226–244, Jun. 1995.

\* cited by examiner

CALL ADMISSION CONTROL FOR NONHOMOGENOUS SOURCES

BACKGROUND OF THE INVENTION

The present invention relates generally to packet-based networks, and more particularly, to a method and system for managing inhomogeneous self-similar traffic sources.

Call Admission Control (CAC) is a preventive method to avoid packet traffic congestion and to deliver required quality of services. In general, in the absence of an efficient CAC mechanism, packet dropping may increase without bounds, causing undesirable speech clipping or even call dropping. Undoubtedly, packet dropping probability is an important criterion in evaluating wireless/cellular packet communications. Packet access requests from ongoing calls are given priority over new call packet access by using a time out mechanism for new calls. New calls waiting more than a given amount of time are denied access to the resource and are cleared from the system. This scheme achieves graceful degradation in packet dropping for existing calls under heavy load conditions, while blocking most new calls. Packet dropping may increase drastically when more users become active. Efficient call admission control algorithms must be used to limit the packet dropping probability for ongoing calls to an adequately selected threshold while offering higher utilization of the scarce radio resource.

It is well known that Ethernet local area network (or "LAN") traffic is statistically self-similar and is characterized by fractal-like behavior. As a result, such traffic exhibits scale-invariance which differs from traditional models of network traffic. It is also well-known that self-similarity degrades the network performance by requiring large queuing buffers, causing delay and packet dropping problems, as well as causing congestion problems. It is further known that the degree of self-similarity for an Ethernet LAN increases with higher loads. As a result, traditional queuing theory proved inadequate to predict performance. For example, ATM switch vendors once assumed that data traffic is a multiplex of a large number of independent traffic streams. Such an assumption resulted in a Poisson process and, as a result, the vendors produced switches with relatively small buffers on the order of 10–100 cells. However, in use, cell losses were beyond that expected and, as a result, the switches had to be redesigned.

It is also known that a traditional Poisson assumption can not adequately represent the state of art packet network environment. It is further known that the total capacity is not merely a summation of individual traffic sources. How to implement a realistic Call Admission Control (CAC) to admit n+1 traffic sources when there are n traffic sources existing is a common concern.

Various approaches have been done to search for an improved Call Admission Control mechanism based on a required capacity of the network. A CAC algorithm based on a required capacity for self-similar traffic was proposed by Wang and Erramilli in Globecom Conference in December 1999. The proposed algorithm is based on a "Scaling Law." The major defect to this approach is that when a new source added, it is likely that the total required capacity is to be reduced. Referring to FIG. 1, two 2-dimensional plots are constructed having a number of sources as the X axis and a estimated required capacity as the Y axis. The plotted line labeled with "H1" represents the condition that the sources are nonhomogeneous, while "H2" is for the homogeneous sources. It is evident, that according to this approach, when the number of sources increases above 8, the required capacity actually drops. This is clearly wrong, and the unreliability of this approach remains to be improved. On the other hand, the algorithm attempts to handle homogeneous sources (i.e., all the involved sources have a same Hurst parameter). This restriction significantly limits the application of this algorithm since the existence of nonhomogeneous sources is a matter of fact.

What is needed is a reliable Call Admission Control mechanism based on required capacity that can reliably deal with nonhomogeneous self-similar traffic sources.

SUMMARY OF THE INVENTION

A reliable system and method is provided for approximating a required network capacity for inhomogeneous self-similar traffic sources in a multimedia packet network. In one embodiment, a diffusion model is first constructed for the multimedia packet network, the diffusion model assuming an input process representing the traffic sources is a sum of a plurality of independent fractional Gaussian noise processes with a plurality of corresponding Hurst parameters. A predetermined Weibull function contained in the diffusion model is then approximated, and the acceptance of a new traffic source is determined based on a predetermined packet loss probability parameter contained in the diffusion model.

In essence, when determining whether a new traffic source should be accepted or not, a desired level of Packet Loss Probability $\epsilon(N)$ is first identified, and a required capacity $C_N$ is then obtained to accommodates N traffic sources. If $C_N$ is less than a predetermined available capacity $C_0$, then the new traffic source will be accepted, if not, it will be rejected.

DESCRIPTION OF THE PREFERRED EMBODIMENT

The present invention relates to packet data networks and system and methods used therein. The present disclosure provides many different embodiments, or examples, for implementing different features of the invention. The following examples, components, and processes are described to help clarify the invention. These are, of course, merely examples and are not intended to limit the invention from that described in the claims.

Figure 1:
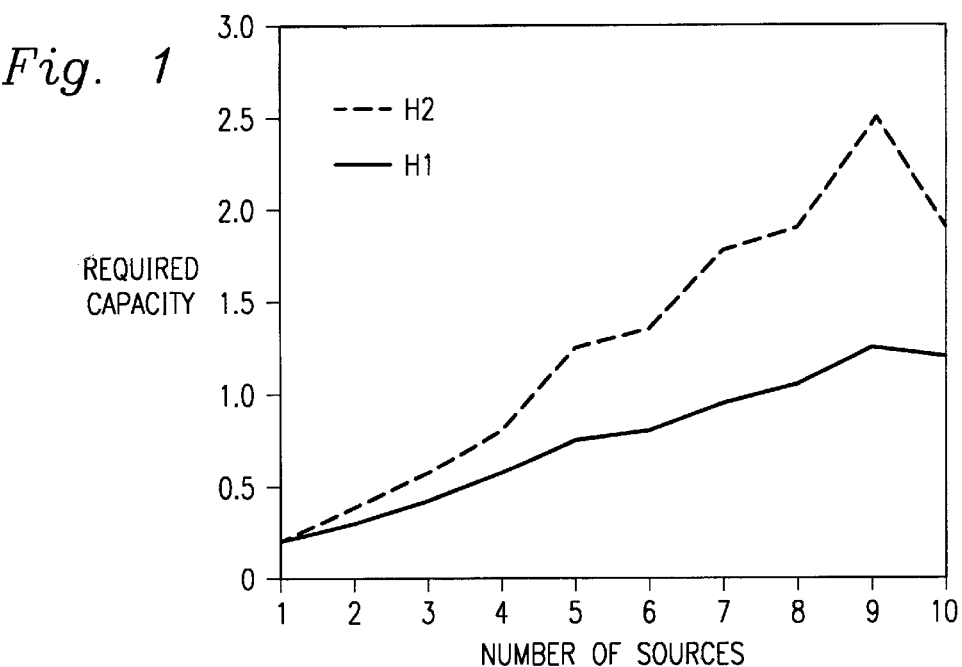
FIG. 1 illustrates two 2-dimensional plots constructed demonstrating the relation between a number of sources and an estimated capacity according to the prior art.
Figure 2:
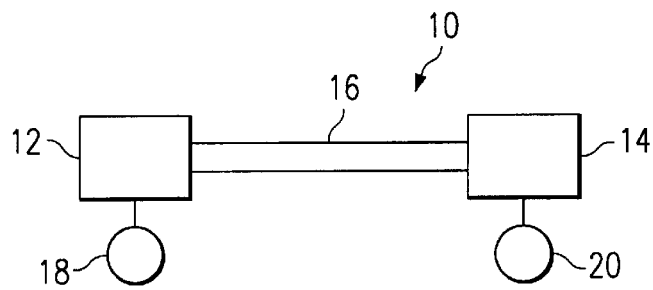
FIG. 2 is a diagram of an exemplary network for implementing one emboidment of the present invention.

Referring now to FIG. 2 of the drawings, the reference numerals 10 designates, in general, a simplified packet network. The network may be the Internet, or any other type of network or combination of networks. The networks 10 includes two servers 12, 14 connected in the present example by a backbone 16. Two nodes 18, 20 connect to the two servers 12, 14, respectively. Each of the nodes 18, 20 and servers 12, 14 include a processing subsystem and memory for performing various tasks. In some embodiments, the procssing subsystems and memory for any node or server may be distributed throughout the network 10. Furthermore, node 18 can call node 20 by making a connection to the server 12, through the backbone 16, and further to the server 14.

The present disclosure provides an improved Call Admission Control mechanism is disclosed based on fractional Brownian motion model, such as may be operable in the network 10 of FIG. 2. The fractional Brownian motion model is well known in the industry and the study of which can be found in many scientific literatures including B. B. Mandelbrot, Fractional Brownian Motions, Fractional Noises and Application, SIAM Rev., 10, 1968, which is incorporated herein by reference. In essence, when determining whether a new traffic source should be accepted or not, a desired level of Packet Loss Probability $\epsilon(N)$ is first identified, and a required capacity $C_N$ is then obtained to accommodates N traffic sources. If $C_N$ is less than a predetermined available capacity $C_0$, then the new traffic source will be accepted, if not, it will be rejected.

Using a diffusion approximation model, assuming that an input process is a sum of N independent fractional Gaussian noise processes with different Hurst parameters, or mathematically:

$$A(t) \equiv \sum_{i=1}^{N} A_i(t)$$

where $A_i(t)$ has a mean of $m_i$, and a variance of $\sigma_i^2 = a_i m_i |t|^{2H_i}$, with a Hurst parameter $H_i$. The diffusion approximation model is known in the industry and described in detail in I. Norros, Studies for a Model for Connectionless Traffic Based on Fractional Brownian Motion, Conference on Applied Probability in Engineering, Computer and Communication Sciences, Paris, June 1993, which is herein incorporated by reference. Further from the diffusion approximation model, the Packet Loss Probability is:

$$\epsilon = Pr[V(t) > x] \geq \text{Max}_{t \geq 0}\left[Q\left\{\frac{x + (C-m)t}{\sigma}\right\}\right],$$

where A(t) has a mean of $$m = \sum_{i=1}^{N} m_i,$$

and a variance of $$\sigma^2 = \sum_{i=1}^{N} \sigma_i^2 = \sum_{i=1}^{N} a_i m_i |t|^{2H_i},$$

and Q is the Weibull function.

The Weibull function Q can be approximated by the following formula:

$$Q(x) = e^{\frac{-x^2}{2}}$$

Hence, the Packet Loss Probability $$\epsilon \geq \text{Max}_{t \geq 0}\left[e^{-\left(\frac{x+(C-m)t}{\sigma}\right)^2}\right] \text{ where } \sigma^2 = \sum_{i=1}^{N} a_i m_i |t|^{2H_i}.$$

By reversing the immediate above equation for the Packet Loss Probability, for a predetermined Packet Loss Probability, using the above approximation form for the Weibull function, a capacity can be determined as follows:
Since $\epsilon < 1$, so $\ln \epsilon < 0$. Thus, $$-\ln \epsilon \leq \text{Min}_{t \geq 0}\left(\frac{x+(C-m)t}{\sigma}\right)^2$$

$$\text{Thus, } C \geq \text{Max}_{t \geq 0}\left\{m + \frac{1}{t}\left[-x + \{(-\ln \epsilon)\sigma^2\}^{1/2}\right]\right\}$$

Assume that the system already has N−1 connections, the Nth connection will be accepted if the above equation is satisfied. The relation among all variables can be represented in the following function:

$$f(t, H) = m - \frac{x}{t} + |t|^{(H-1)}\left\{(-\ln \epsilon)\left(\sum_{i=1}^{N} a_i m_i\right)\right\}^{1/2}$$

wherein, at a high level, it is understood that m represents a mean value, x represents a buffer size, and the last complex component on the right hand side of the plus sign of the equation represents a measurement of self-similarity. Notice that for $$f_N(t) \equiv m + \frac{1}{t}\left[-x + \left\{(-\ln \epsilon)\left(\sum_{i=1}^{N} a_i m_i |t|^{2H_i}\right)\right\}^{1/2}\right],$$

$$f_N(t) - f_{N-1}(t) = (-\ln \epsilon)^{1/2}\left\{\left(\sum_{i=1}^{N} a_i m_i |t|^{2H_i}\right)^{1/2} - \left(\sum_{i=1}^{N-1} a_i m_i |t|^{2H_i}\right)^{1/2}\right\},$$

where $a_i > 0$, $m_i > 0$, $t > 0$, and $0.5 \leq H_i \leq 1$.

Since the function $y = \overline{a-x} - \overline{a}$ is positive when $x > 0$ and $a > 0$, so $f_N(t) - f_{N-1}(t) > 0$. That is, the function $f_N(t)$ above increases as N increases. Consequently, the present invention avoids the above-mentioned unstability defect suffered by the Scaling Law Call Admission Control algorithm.

Consider now a function of a form of:

$$g(t) = m + \frac{-x + at^H}{t},$$

where m, x, a and H are positive constants, with $0.5 \leq H \leq 1$. In a geometrical representation, this function is a shift along an axis by the amount of m of the function $$f(t) = \frac{-x + at^H}{t}.$$

In the neighborhood of zero for the value of t, the portion $$\frac{-x}{t}$$

dominates f(t), while when t is large, the portion $$\frac{a}{t^{1-H}}$$

dominates f(t). Since $$\frac{-x}{t}$$

is negative when t=0, and as $$\frac{a}{t^{1-H}}$$

is positive for large t, so f(t) crosses the t-axis at some point $t = t_0$. Therefore, $$t_0 = \left(\frac{x}{a}\right)^{1/H}.$$

In order to find the maximum value of f(t), a derivative of f(t) can be taken, set it equal to zero, and then solve for t. That is, $$f'(t) = \frac{x + a(H-1)t^H}{t^2} = 0, \text{ so } t = \left(\frac{x}{a(1-H)}\right)^{1/H}$$

Let it be defined that $$T_i \equiv \left(\frac{x}{(1-H_i)\sqrt{(-\ln \epsilon)\left(\sum_{j=1}^{N} a_j m_j\right)}}\right)^{1/H_i},$$

and let $$T_{min} = Min_{1 \leq i \leq N}\{T_i\}$$
$$T_{max} = Max_{1 \leq i \leq N}\{T_i\},$$

then the solution $t = t_{Max}$ satisfying $$Max_{t \geq 0}\left\{m + \frac{1}{t}\left[-x + \left\{(-\ln \epsilon)\left(\sum_{i=1}^{N} a_i m_i |t|^{2H_i}\right)\right\}^{1/2}\right]\right\}$$

would be in the interval $[T_{min}, T_{max}]$, i.e. $T_{min} \leq t_{Max} \leq T_{Max}$. Substituting $t_{Max}$ into $$C_N(t) \equiv \left\{m + \frac{1}{t}\left[-x + \left\{(-\ln \epsilon)\left(\sum_{i=1}^{N} a_i m_i |t|^{2H_i}\right)\right\}^{1/2}\right]\right\}$$

would result in $$C_N \equiv C_N(t_{Max})$$

$$= Max_{t \geq 0}\left\{m + \frac{1}{t}\left[-x + \left\{(-\ln \epsilon)\left(\sum_{i=1}^{N} a_i m_i |t|^{2H_i}\right)\right\}^{1/2}\right]\right\}$$

where $C_N$ is the required capacity for N traffic sources to be admitted to the network.

It is further noted that in the case of homogeneous traffic sources, then $T_{min} = T_{max}$, in which case the solution $t = t_{Max}$ satisfies $t = t_{Max} = T_{min} = T_{max}$.

Figure 3:
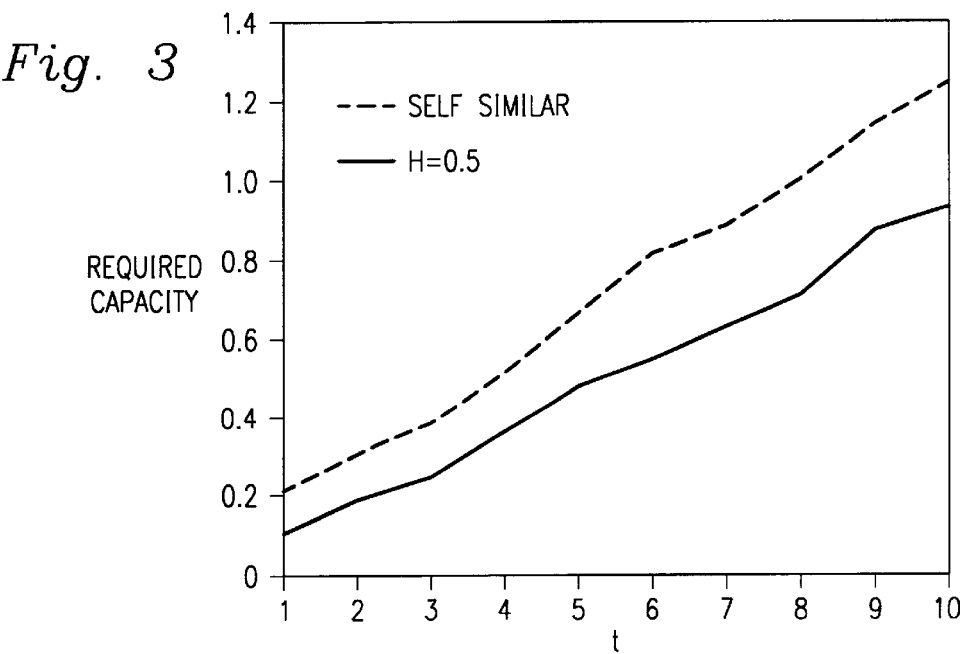
FIG. 3 illustrates two 2-dimensional plots demonstrating the relation between a number of sources and an estimated capacity according to one example of the present invention.

An example representing the Call Admission Control algorithm described above is shown in FIG. 3 below. This example uses parameters x=0, n=10, $\epsilon$=0.01, with the arrays m and a given by m=[0.1, 0–0.07, 0.05, 0.1, 0.11, 0.08, 0.06, 0.09, 0.12, 0.075]

a=[0.05, 0.09, 0.07, 0.1, 0.08, 0.11, 0.09, 0.12, 0.06, 0.075]

and the different Hurst parameters for the 10 traffic sources as

H=[0.95, 0.90, 0.90, 0.90, 0.85, 0.95, 0.90, 0.85, 0.95, 0.850]

for the self-similar curve, and $H_2$=0.5 for the non-self-similar case.

The present invention is capable to handle inhomogeneous self-similar traffic sources and avoids the instability that is inherent for the Scaling Law Call Admission Control mechanism as described.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for approximating a required network capacity for inhomogeneous self-similar traffic sources in a multimedia packet network, the method comprising the steps of:

constructing a diffusion model for the multimedia packet network, the diffusion model assuming an input process representing the traffic sources as a sum of independent fractional Gaussian noise processes with corresponding Hurst parameters;

approximating a predetermined Weibull function contained in the diffusion model; and determining the acceptance of a new traffic source based on a packet loss probability parameter contained in the diffusion model.

2. The method of claim 1 wherein the step of constructing further includes constructing the diffusion model as $$A(t) \equiv \sum_{i=1}^{N} A_i(t),$$

wherein $A_i(t)$ has a mean of $m_i$, and a variance of $\sigma_i^2 = a_i m_i |t|^{2H_i}$, and wherein the Hurst parameter is $H_i$.

3. The method of claim 1 wherein the step of approximating further includes the step of approximating the Weibull function (represented as Q) as $$Q(x) = e^{\frac{-x^2}{2}}.$$

4. The method of claim 1 wherein the step of determining further includes the step of:

defining the packet loss probability parameter as $$\epsilon = Pr[V(t) > x] \geq Max_{t \geq 0}\left[Q\left\{\frac{x + (C-m)t}{\sigma}\right\}\right],$$

where the diffusion model has a mean of $$m = \sum_{i=1}^{N} m_i$$

and a variance of $$\sigma^2 = \sigma^2 \sum_{i=1}^{N} \sigma_i^2 = \sum_{i=1}^{N} a_i m_i |t|^{2H_i},$$

wherein t is a time parameter, x is a parameter indicating a buffer size, C represents the network capacity, N is an integer representing a number of traffic sources, and Q is the Weibull function.

5. A method for approximating a required network capacity for inhomogeneous self-similar traffic sources in a multimedia packet network, the method comprising the steps of:

constructing a diffusion model for the multimedia packet network, the diffusion model assuming an input process representing the traffic sources as a sum of a plurality of independent fractional Gaussian noise processes with a plurality of corresponding Hurst parameters, the diffusion model is represented mathematically as:

$$A(t) \equiv \sum_{i=1}^{N} A_i(t),$$

wherein $A_i(t)$ has a mean of $m_i$, and a variance of $\sigma_i^2 = a_i m_i |t|^{2H_i}$, and wherein the Hurst parameter is $H_i$;

approximating a predetermined Weibull function contained in the diffusion model as $$Q(x) = e^{\frac{-x^2}{2}},$$

wherein Q represents the Weibull function; and determining the acceptance of a new traffic source based on a satisfaction of a mathematical relation between the network capacity and a packet loss probability parameter contained in the diffusion model, the mathematical relation being represented as $$C \geq \text{Max}_{t \geq 0}\{m + \frac{1}{t}[-x + \{(-\ln \epsilon)\sigma^2\}^{1/2}]\},$$

wherein C represents the network capacity, x represents a buffer size, and $\epsilon$ represents the packet loss probability parameter.

6. A computer program for approximating a required network capacity for inhomogeneous self-similar traffic sources in a multimedia packet network, the program comprising the instructions for:

constructing a diffusion model for the multimedia packet network, the diffusion model assuming an input process representing the traffic sources is a sum of a plurality of independent fractional Gaussian noise processes with a plurality of corresponding Hurst parameters;

approximating a predetermined Weibull function contained in the diffusion model; and determining the acceptance of a new traffic source based on a packet loss probability parameter contained in the diffusion model.

7. The program of claim 6 wherein the instructions for constructing further includes constructing the diffusion model as $$A(t) \equiv \sum_{i=1}^{N} A_i(t),$$

wherein Ai(t) has a mean of mi, and a variance of $\sigma_i^2 = a_i m_i |t|^{2H_i}$, and wherein the Hurst parameter is $H_i$.

8. The program of claim 6 wherein the instructions for approximating further includes the instructions for approximating the Weibull function (represented as Q) as $$Q(x) = e^{\frac{-x^2}{2}}.$$

9. The program of claim 6 wherein the instructions for determining further includes the instructions for:

defining the packet loss probability parameter as $$\epsilon = Pr[V(t) > x] \geq \text{Max}_{t \geq 0}\left[Q\left\{\frac{x + (C - m)t}{\sigma}\right\}\right],$$

where the diffusion model has a mean of $$m = \sum_{i=1}^{N} m_i$$

and a variance of $$\sigma^2 = \sigma^2 \sum_{i=1}^{N} \sigma_i^2 = \sum_{i=1}^{N} a_i m_i |t|^{2H_i},$$

wherein t is a time parameter, x is a parameter indicating a buffer size, C represents the network capacity, N is an integer representing a number of traffic sources, and Q is the Weibull function.

10. A system for approximating a required network capacity for inhomogeneous self-similar traffic sources in a multimedia packet network, the system comprising:

processing subsystem;

storage accessable by the processing subsystem; and a plurality of program instructions for:

constructing a diffusion model for the multimedia packet network, the diffusion model assuming an input process representing the traffic sources as a sum of a plurality of independent fractional Gaussian noise processes with a plurality of corresponding Hurst parameters, the diffusion model is represented mathematically as:

$$A(t) \equiv \sum_{i=1}^{N} A_i(t),$$

wherein $A_i(t)$ has a mean of $m_i$, and a variance of $\sigma_i^2 = a_i m_i |t|^{2H_i}$, and wherein the Hurst parameter is $H_i$;

approximating a predetermined Weibull function contained in the diffusion model as $$Q(x) = e^{\frac{-x^2}{2}},$$

wherein Q represents the Weibull function; and determining the acceptance of a new traffic source based on a satisfaction of a mathematical relation between the network capacity and a packet loss probability parameter contained in the diffusion model, the mathematical relation being represented as $$C \geq \text{Max}_{t \geq 0}\{m + \frac{1}{t}[-x + \{(-\ln \epsilon)\sigma^2\}^{1/2}]\},$$

where C represents the network capacity, x represents a buffer size, and $\epsilon$ represents the packet loss probability parameter.

* * * * *